United States Patent
Ishikawa et al.

(10) Patent No.: US 11,443,211 B2
(45) Date of Patent: Sep. 13, 2022

(54) EXTRACTING IMPORTANT SENTENCES FROM DOCUMENTS TO ANSWER HYPOTHESIS THAT INCLUDE CAUSES AND CONSEQUENCES

(71) Applicant: INTERNATIONAL BUSINESS MACHINES CORPORATION, Armonk, NY (US)

(72) Inventors: Miki Ishikawa, Tokyo (JP); Sachiko Yoshihama, Kanagawa-ken (JP); Issei Yoshida, Tokyo (JP); Kohichi Kamijoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 16/737,489

(22) Filed: Jan. 8, 2020

(65) Prior Publication Data
US 2021/0209493 A1    Jul. 8, 2021

(51) Int. Cl.
*G06F 17/00* (2019.01)
*G06N 5/04* (2006.01)
(Continued)

(52) U.S. Cl.
CPC .......... *G06N 5/041* (2013.01); *G06F 40/20* (2020.01); *G06F 40/44* (2020.01); *G06F 40/49* (2020.01)

(58) Field of Classification Search
CPC ......... G06N 5/041; G06F 40/20; G06F 40/44; G06F 40/49; G06F 16/3329; G06F 40/284; G06F 40/30
See application file for complete search history.

(56) References Cited

U.S. PATENT DOCUMENTS 9,607,035 B2    3/2017  Allen et al.
2010/0235164 A1*  9/2010  Todhunter ............... G06F 40/35
                                                                704/9
(Continued)

FOREIGN PATENT DOCUMENTS

CN        102937960        2/2013

OTHER PUBLICATIONS

Kim, Soo-Min, and Eduard Hovy. "Extracting opinions, opinion holders, and topics expressed in online news media text." Proceedings of the Workshop on Sentiment and Subjectivity in Text. 2006 (Year: 2006).*

(Continued)

*Primary Examiner* — Andrew T McIntosh
(74) *Attorney, Agent, or Firm* — Tutunjian & Bitetto, P.C.; Joseph Petrokaitis

(57) ABSTRACT

A method is provided for validating a hypothesis sentence. The method extracts, from a document database D using a hypothesis sentence that includes a causal part and a consequence part, a set D1 of documents related to the causal part. The method extracts, from set D1, a set S of sentences that include expressions of opinion. The method obtains a word list W of words that have a high co-occurrence in the set D1. The method selects, from the set S, a set S1 of sentences that are positionally close to any of the words in the word list W. The method selects, from the set S, a set S2 of sentences that are related to the words in the consequence part of the hypothesis. The method extracts and displays sentences included in both the set S1 and the set S2 as opinion sentences in relation to the hypothesis sentence.

20 Claims, 6 Drawing Sheets

(51) Int. Cl.
*G06F 40/44* (2020.01)
*G06F 40/49* (2020.01)
*G06F 40/20* (2020.01)

(56) References Cited

U.S. PATENT DOCUMENTS

2016/0357854 A1* 12/2016 Hashimoto ......... G06F 16/3344
2017/0286408 A1 10/2017 Yanai et al.
2020/0242146 A1* 7/2020 Kalukin ................ G06N 5/003

OTHER PUBLICATIONS

Florou, Eirini, et al. "Argument extraction for supporting public policy formulation." Proceedings of the 7th Workshop on language technology for cultural heritage, social sciences, and humanities. 2013 (Year: 2013).*

Jin, Wei, Hung Hay Ho, and Rohini K. Srihari. "OpinionMiner: a novel machine learning system for web opinion mining and extraction." Proceedings of the 15th ACM SIGKDD international conference on Knowledge discovery and data mining. 2009 (Year: 2009).*

Levy et al., "Context Dependent Claim Detection", Proceedings of COLING 2014, the 25th International Conference on Computational Linguistics: Technical Papers, Aug. 2014, pp. 1489-1500.

Mell et al. "The NIST Definition of Cloud Computing", NIST Special Publication 800-145, 2011, 7 pages.

Nurse Key, "Cause and Effect, Hypothesis Testing and Estimation", available at: https://nursekey.com/cause-and-effect-hypothesis-testing-and-estimation, Mar. 2017, pp. 1-3.

* cited by examiner

EXTRACTING IMPORTANT SENTENCES FROM DOCUMENTS TO ANSWER HYPOTHESIS THAT INCLUDE CAUSES AND CONSEQUENCES

BACKGROUND

The present invention generally relates to data processing, and more particularly to extracting important sentences from documents to answer hypothesis that include causes and consequences.

It is important for investors in financial markets to correctly predict economic movements. Investors pay attention to the effects on the economy caused by various events that can occur in the world, and make their own assumptions about economic trends. Investors often read news articles and analyst reports in order to grasp economic trends in the world, such as which trend is dominant and so forth. Since opinions change responsive to the occurrence of various events, it is important to recognize the current opinion of the world as broadly as possible. Therefore, when a user's hypothesis in the form of "causes and consequences" is taken as an input, it is desirable to obtain opinions about the hypothesis extracted from news articles and report documents to help judge the validity of the user's hypothesis.

Examples of hypothesis include the following:
1. [Rising oil prices would have a negative impact on the world economy]
Cause: rising oil prices; Consequence: have a negative impact on the world economy
2. [The monetary policy will significantly contribute to economic growth]
Cause: the monetary policy; Consequence: significantly contribute to economic growth.

When searching for a sentence related to a hypothesis that includes a cause and a consequence, if a sentence including such words is simply searched (AND search), it will not hit (match) unless the word is included in the target sentence, and the recall will be lowered (low recall). For example, sentences that are closely related to the "cause" cannot be extracted unless they include the word of the cause itself. Meanwhile, a method of searching for statements including either cause or consequence (OR Search) finds many irrelevant statements (OR search), and the precision will be lowered. It is not obvious how to find a good balance between recall and precision. With regard to the "cause" of the hypothesis, it is desirable to extract not only words and synonyms specified in the hypothesis but also matters highly related to the hypothesis. On the other hand, with regard to the "consequence" of the hypothesis, it is desirable to extract statements expressing opinions on the consequence.

SUMMARY

According to an aspect of the present invention, a computer-implemented method is provided for machine-validating an input hypothesis sentence. The method includes extracting, by a hardware processor from a document database D using the input hypothesis sentence that includes a causal part and a consequence part, a set D1 of documents related to the causal part. The method further includes extracting, by the hardware processor from the set D1 of documents, a set S of sentences that include one or more expressions of opinion. The method also includes obtaining, by the hardware processor, a word list W of words that have a high co-occurrence in the set D1 of documents. The method additionally includes selecting, by the hardware processor from the set S of sentences, a set S1 of sentences that are positionally close to any of the words in the word list W. The method also includes selecting, by the hardware processor from the set S of sentences, a set S2 of sentences that are related to the words in the consequence part of the hypothesis. The method additionally includes extracting, by the hardware processor, and displaying, by a display device, sentences included in both the set S1 of sentences and the set S2 of sentences as opinion sentences in relation to the input hypothesis sentence.

According to another aspect of the present invention, a computer program product is provided for machine-validating an input hypothesis sentence. The computer program product includes a non-transitory computer readable storage medium having program instructions embodied therewith. The program instructions are executable by a computer to cause the computer to perform a method. The method includes extracting, by a hardware processor from a document database D using the input hypothesis sentence that includes a causal part and a consequence part, a set D1 of documents related to the causal part. The method further includes extracting, by the hardware processor from the set D1 of documents, a set S of sentences that include one or more expressions of opinion. The method also includes obtaining, by the hardware processor, a word list W of words that have a high co-occurrence in the set D1 of documents. The method additionally includes selecting, by the hardware processor from the set S of sentences, a set S1 of sentences that are positionally close to any of the words in the word list W. The method also includes selecting, by the hardware processor from the set S of sentences, a set S2 of sentences that are related to the words in the consequence part of the hypothesis. The method further includes extracting, by the hardware processor, and displaying, by a display device, sentences included in both the set S1 of sentences and the set S2 of sentences as opinion sentences in relation to the input hypothesis sentence.

According to yet another aspect of the present invention, a computer processing system is provided for machine-validating an input hypothesis sentence. The computer processing system includes a memory device including program code stored thereon. The computer processing system further includes a hardware processor, operatively coupled to the memory device, and configured to run the program code stored on the memory device to extract, from a document database D using the input hypothesis sentence that includes a causal part and a consequence part, a set D1 of documents related to the causal part. The hardware processor further runs the program code to extract, from the set D1 of documents, a set S of sentences that include one or more expressions of opinion. The hardware processor also runs the program code to obtain a word list W of words that have a high co-occurrence in the set D1 of documents. The hardware processor additionally runs the program code to select, from the set S of sentences, a set S1 of sentences that are positionally close to any of the words in the word list W. The hardware processor also runs the program code to select, from the set S of sentences, a set S2 of sentences that are related to the words in the consequence part of the hypothesis. The hardware processor further runs the program code to extract and cause to be displayed on a display device sentences included in both the set S1 of sentences and the set S2 of sentences as opinion sentences in relation to the input hypothesis sentence.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to extracting important sentences from documents to answer hypothesis that include causes and consequences.

One or more embodiments of the present invention focus on an asymmetric aspect of the cause and consequence of a particular sentence under consideration. For example, with regard to the cause: rather than being written explicitly, an embodiment of the present invention looks for the cause to be implied as the context of the entire document including the particular sentence under consideration. Moreover, with regard to consequence: explicitly expressions related to the consequence are included in the particular sentence under consideration. The preceding approach provides a good balance between recall and precision.

In an embodiment, the input to the present invention is a hypothetical sentence that includes a causal part and a consequence part. In an embodiment, the input is processed relative to a set of opinion sentences as answer candidates obtained from a set of documents related to the causal part of the hypothesis. In an embodiment, opinion sentences are extracted that meet the following conditions related to the causal and consequence parts of the hypothesis as answers.

For the causal part, extract sentences in which any of the following words occur near the document: characteristic (high co-occurrence, etc.) words in the document associated with the causal part of the hypothesis.

For the consequence part, extract sentences that are closely related to the words in the consequence of a hypothesis. In an embodiment, the following weight adjustments may be included:

increase the weight of similarity between the word in the consequence of the hypothesis and the objective of the opinion in the candidate sentence; and decrease the weight of similarity according to the word polarity (rise, fall, etc.).

Figure 1:
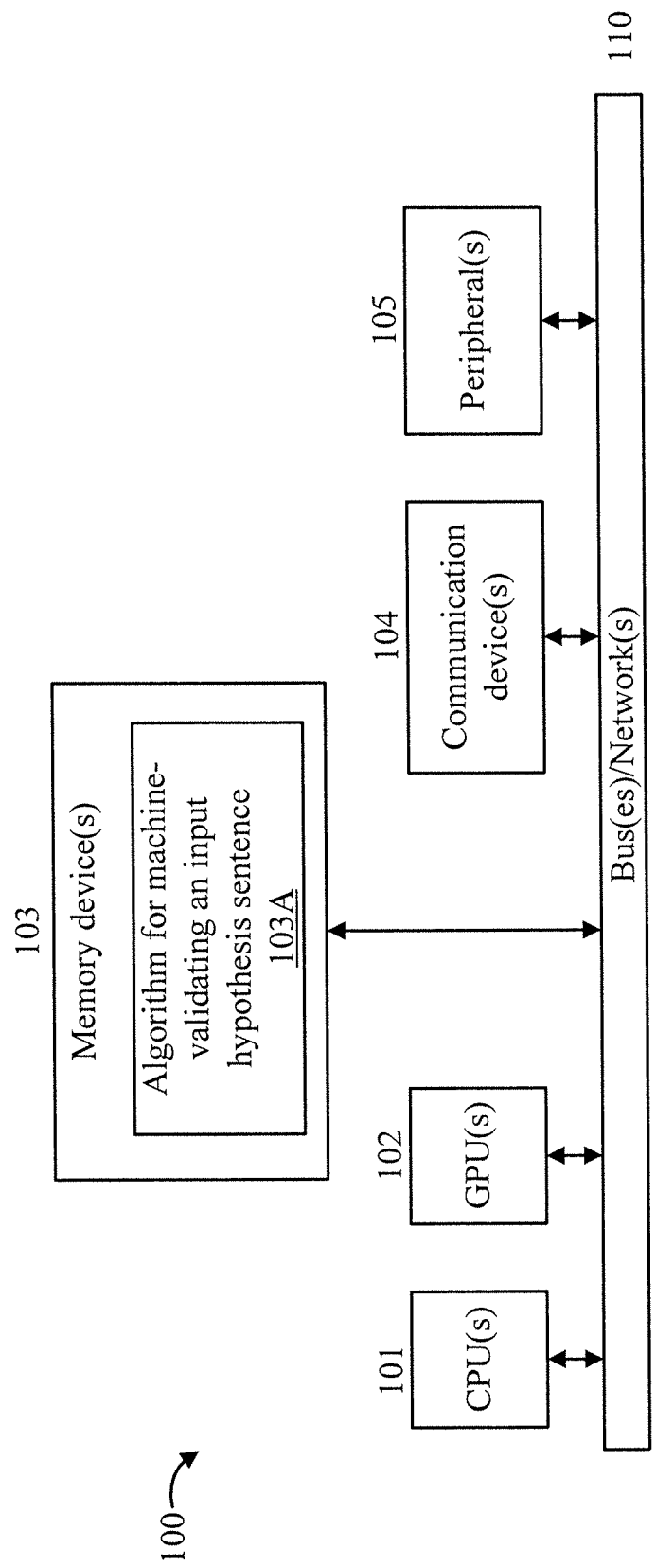
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embedment, memory devices 103 can store and be configured to implement a special purpose algorithm. In an embodiment, the memory devices 103 can store an algorithm 103A for machine-validating an input hypothesis sentence that includes a causal part and a consequence part.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 5-6). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
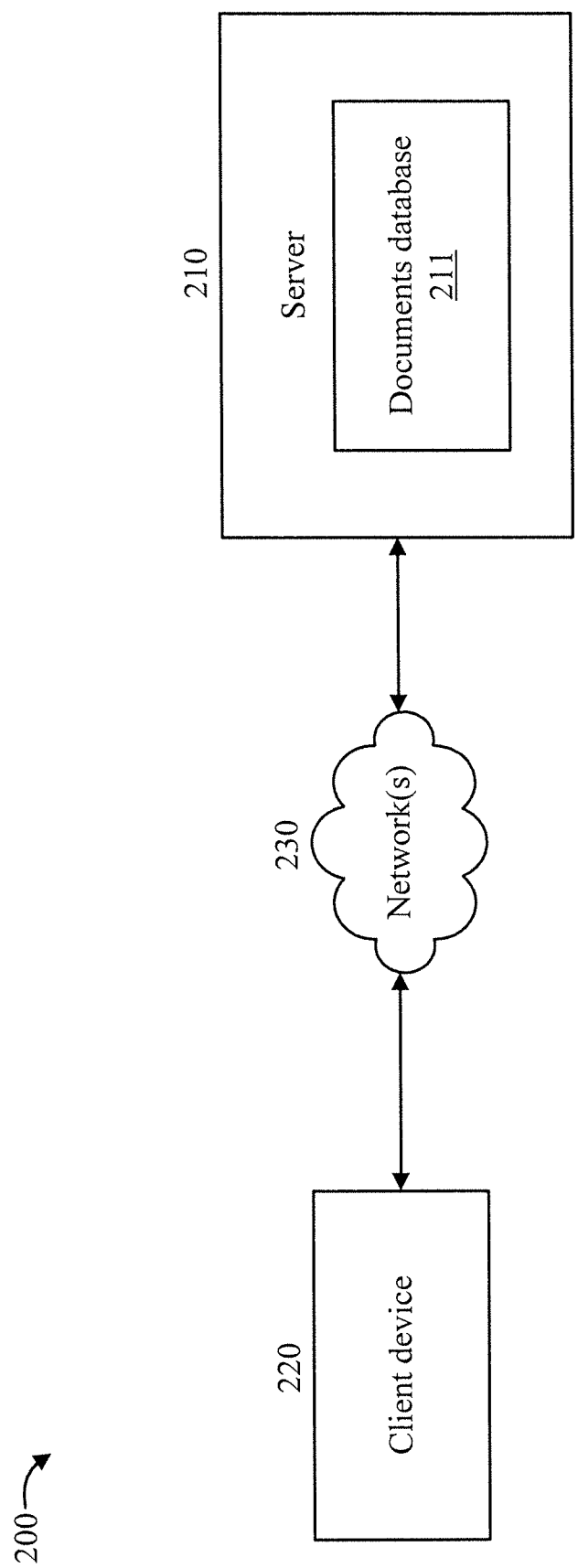
FIG. 2 is a block diagram showing an exemplary environment, in accordance with an embodiment of the present invention.

FIG. 2 is a block diagram showing an exemplary environment 200, in accordance with an embodiment of the present invention.

The environment 200 includes a server 210 having a documents database 211. The documents database 211 can include, for example, but is not limited to document types such as, for example, news, financial reports, and so forth.

The environment further includes a client device 220 for accessing the documents database 211 and/or a result provided by the documents database 211. The server 210 and the client device 200 communicate through one or more networks 230.

The client device 220 receives an input hypothetical sentence from a user that includes a causal part and a consequence part. The client device 220 sends the input hypothetical sentence to the server 210, which processes the input hypothetical sentence to output to the client device 220 a set of opinion sentences in relation to the hypothesis sentence. The server can process the input hypothetical sentence using the algorithm 103A.

While a single server 210 and a single client device 220 is shown for the sakes of brevity and clarity, it is to be appreciated that the environment can include more than one server and more than one client device, while maintaining the spirit of the present invention.

Figure 3:
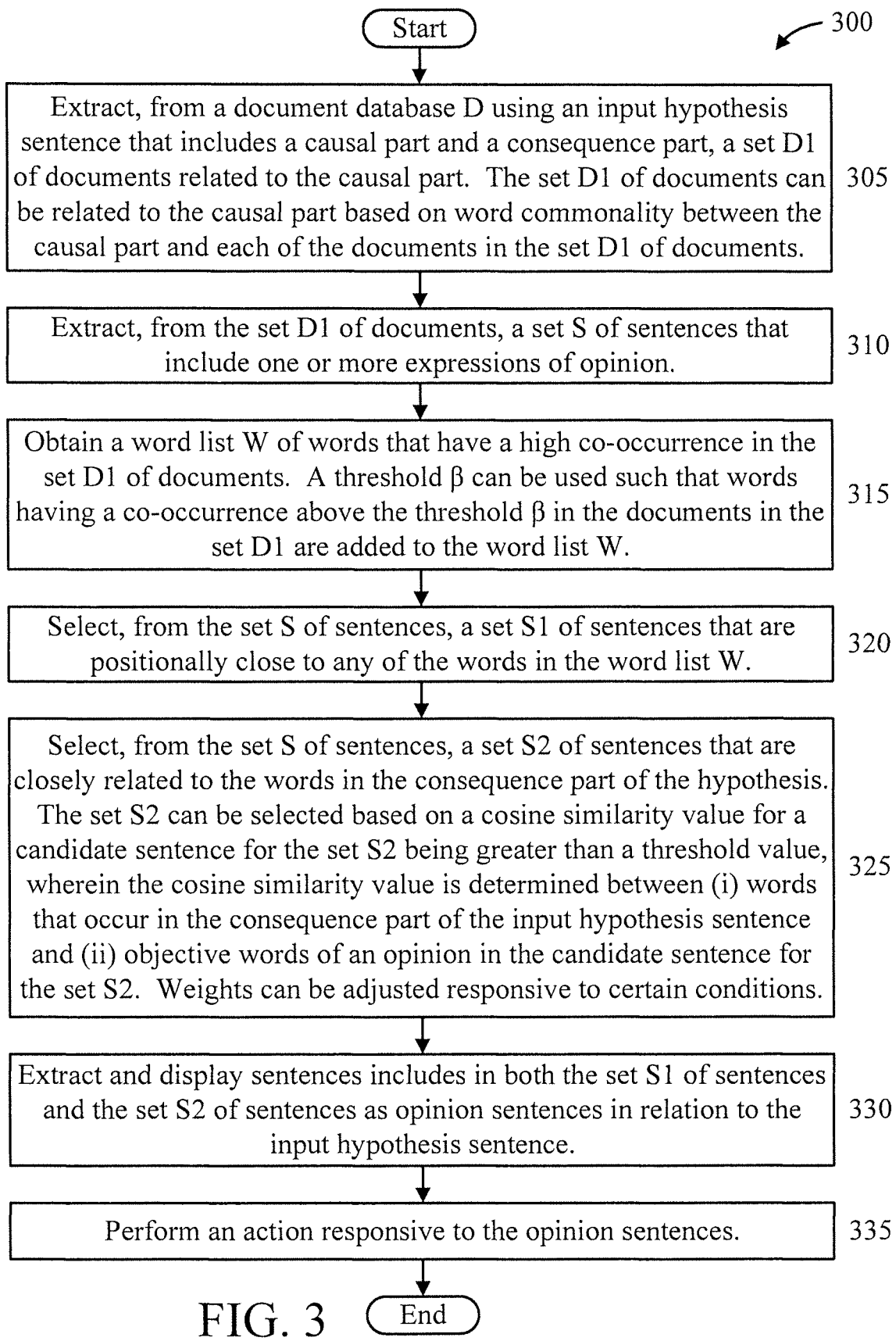
FIG. 3 is a flow diagram showing an exemplary method for machine-based answer extraction for a hypothesis sentence that includes a causal part and a consequence part, in accordance with an embodiment of the present invention.

FIG. 3 is a flow diagram showing an exemplary method 300 for machine-based answer extraction for a hypothesis sentence that includes a causal part and a consequence part, in accordance with an embodiment of the present invention.

At block 305, extract, from a document database D using an input hypothesis sentence that includes a causal part and a consequence part, a set D1 of documents related to the causal part. In an embodiment, the set D1 of documents can be related to the causal part based on word commonality between the causal part and each of the documents in the set D1 of documents. In an embodiment, set D1 can be obtained by performing keyword search for the causal part in the documents.

At block 310, extract, from the set D1 of documents, a set S of sentences that include one or more expressions of opinion. Such sentences in set S can include expressions such as, but not limited to, for example, "say", "expect", "think", "believe", "anticipate", and so forth.

At block 315 (in relation to the causal part), obtain a word list W of words that have a high co-occurrence in the set D1 of documents. In an embodiment, a threshold β can be used such that words having a co-occurrence above the threshold β in the documents in the set D1 are added to the word list W.

At block 320 (in relation to the causal part), select, from the set S of sentences, a set S1 of sentences that are positionally close to any of the words in the word list W.

At block 325 (in relation to the consequence part), select, from the set S of sentences, a set S2 of sentences that are closely related to the words in the consequence part of the hypothesis. In an embodiment, the set S2 can be selected based on a cosine similarity value for a candidate sentence for the set S2 being greater than a threshold value, wherein the cosine similarity value is determined between (i) words that occur in the consequence part of the input hypothesis sentence and (ii) objective words of an opinion in the candidate sentence for the set S2. In an embodiment, weights can be adjusted responsive to certain conditions (e.g., noun match ratio and word polarities).

At block 330, extract and display sentences includes in both the set S1 of sentences and the set S2 of sentences as opinion sentences in relation to the input hypothesis sentence.

At block 335, perform an action responsive to the opinion sentences. For example, in the case that the opinion sentences affirm an input hypothesis sentence, the physical state of a machine can be controlled. For example, if the opinion sentences affirm an undesirable consequence part in relation to the causal part, then the machine can be controlled to avoid the undesirable consequence part. This can be achieved, for example, by automatically shutting the machine down, or automatically activating one or more safely mechanisms to prevent the occurrence of the undesirable consequence.

The following input hypothesis sentence is now considered as an example in order to illustrate block 315:

1. [Rising oil prices would have a negative impact on the world economy]
Cause: rising oil prices; Consequence: have a negative impact on the world economy; Keywords: "rising", "oil", "prices".

In relation to this example, the word list W could include the following words in order of their magnitude of co-occurrence above a threshold amount: (1) OPEC; (2) barrels per day; (3) crude; (4) WTI; (5) shale; (6) Brent; (7) barrel; (8) crude oil; (9) drilling; (10) petroleum; (11) commodity; (12) export; (13) energy; (14) gas; (15) futures; (16) output; (17) Saudi Arabia; (18) supply; (19) economic growth; and (20) slowdown.

A further description will now be given regarding block 315 (obtain a word list W), in accordance with an embodiment of the present invention.

In an embodiment, extract words $w_i$ that meet the following conditions:

$$(n_{i1}/N_1)$$

where
$N_0$: total number of document
$N_1$: number of documents including hypothesis-related keywords
W: set of words that occur in documents that include hypothesis-related keywords
$n_{i0}$: number of occurrences of the word $w_i (w_i \in W)$ in $N_0$
$n_{i1}$: number of occurrences of the word $w_i (w_i \in W)$ in $N_1$
∝: threshold A further description will now be given regarding block 320 (select a set S1 of sentences), in accordance with an embodiment of the present invention.

Figure 4:
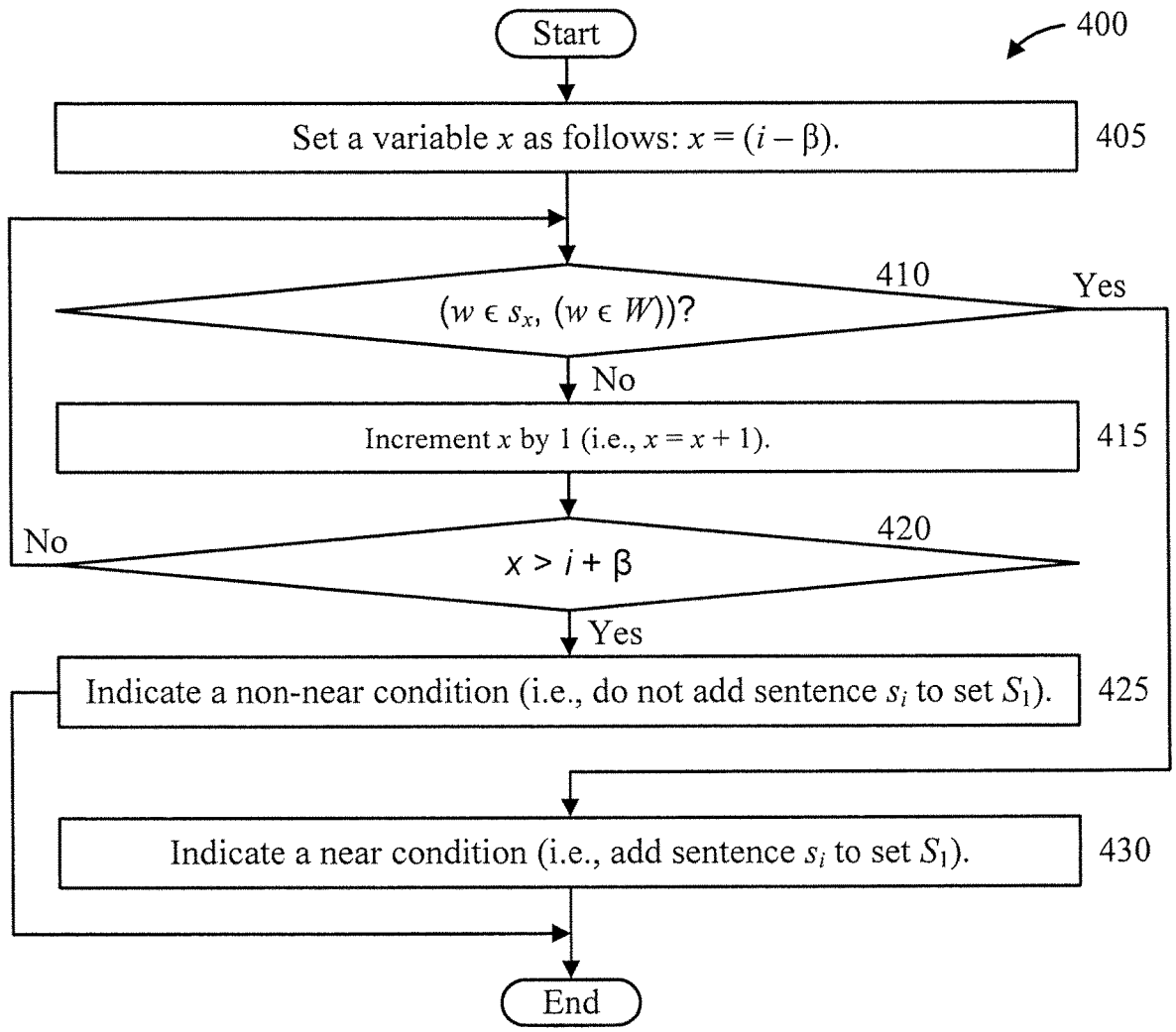
FIG. 4 is a flow diagram of a method for performing a block in the method of FIG. 3, in accordance with an embodiment of the present invention.

The description will be given with respect to FIG. 4. FIG. 4 is a flow diagram of a method 400 for performing block 320 of method 300 of FIG. 3, in accordance with an embodiment of the present invention.

The following variable definitions apply:

i: sentence number of the document
$s_i$: sentence including expressions of opinion extracted as the candidate outputs
W: set of high occurrence words
β: threshold It is to be appreciated that the following blocks of method 400 are performed for each $s_i$.

At block 405, set a variable x, denoting sentence number, as follows: x=(i−β).

At block 410, determine if (w∈$s_x$, (w∈W)). If so, then proceed to block 430.

Otherwise, proceed to block 415.

At block 415, increment x by 1 (i.e., x=x+1).

At block 420, determine if x>i+β. If so, then proceed to block 425. Otherwise, return to block 410.

At block 425, indicate a non-near condition (i.e., do not add sentence $s_i$ to set $S_1$).

At block 430, indicate a near condition and add sentence $s_i$ to set $S_1$.

A further description will now be given regarding block 325 (select a set S2 of sentences), in accordance with an embodiment of the present invention.

Extract words $w_i$ that meet the following conditions:

$W_0$: words that are the consequence of an input hypothesis sentence. In an embodiment, synonyms can be considered.
$W_i$: objective words of the opinion in the candidate sentence i ($s_i$). As an example, consider "I expect that XXX would . . . ", where "XXX" is an objective word(s). In an embodiment, synonyms can be considered.
γ: threshold In an embodiment, similarity is calculated using cosine similarity. Words having a cosine similarity greater than a threshold are considered highly relevant, i.e., cos($W_0$, $W_i$)>γ.

A further description will now be regarding weight adjustment for block 325, in accordance with an embodiment of the present invention.

In an embodiment, block 325 can include increasing a similarity weight between (i) the words that occur in the consequence part of the input hypothesis sentence and (ii) the objective words of the opinion in the candidate sentence for the set S2, responsive to noun match ratio (noun example is, impact, world economy from the above example (e.g., Rising oil prices would have a negative impact on the world economy).

In an embodiment, block 325 can include decreasing a similarity weight between (i) the words that occur in the consequence part of the input hypothesis sentence and (ii) the objective words of the opinion in the candidate sentence for the set S2, responsive to opposing word polarities (e.g., rise versus fall, up versus down, etc.).

For example, if the noun match ratio is 0.4, the similarity weight is cos(W0, W1)*(1+0.4). If polarities word is included, (e.g. the number of the words is 2), the similarity weight is cos(W0, W1)*(1−0.1*2).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
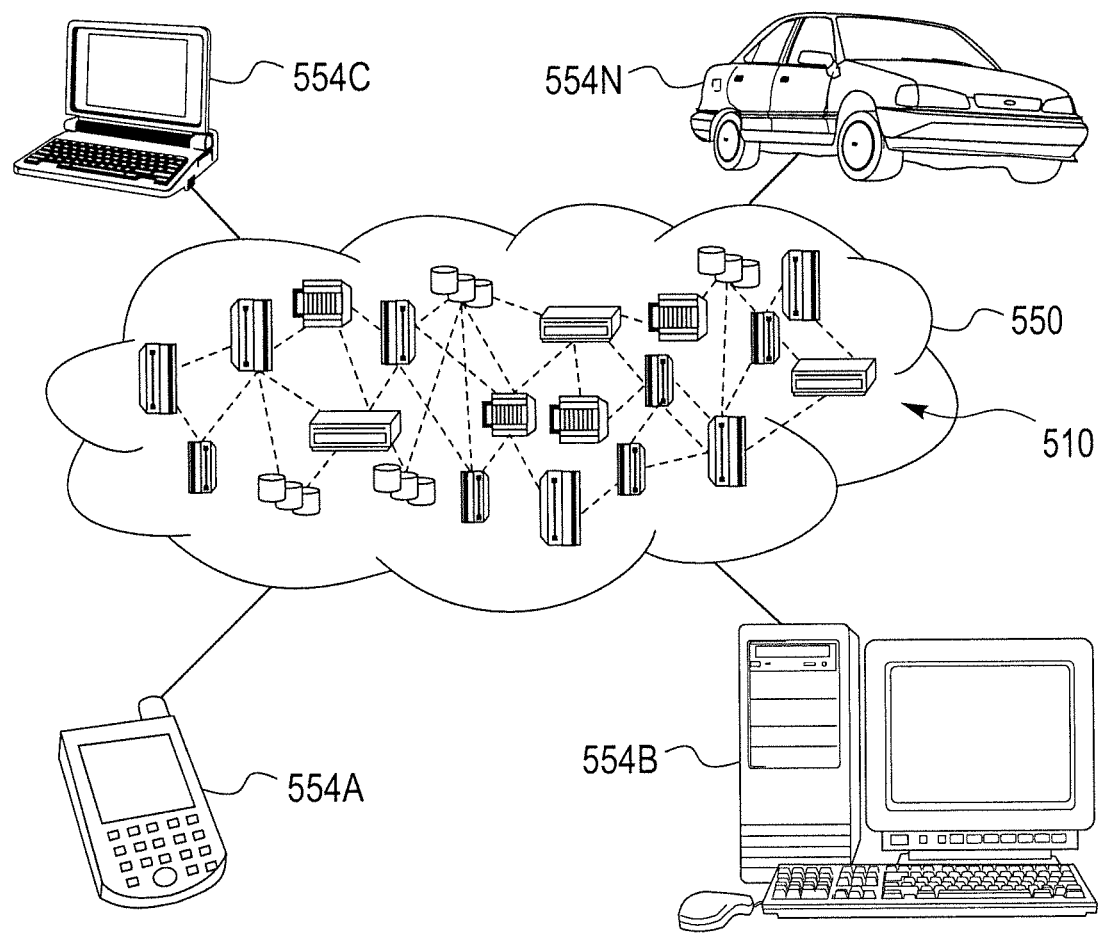
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
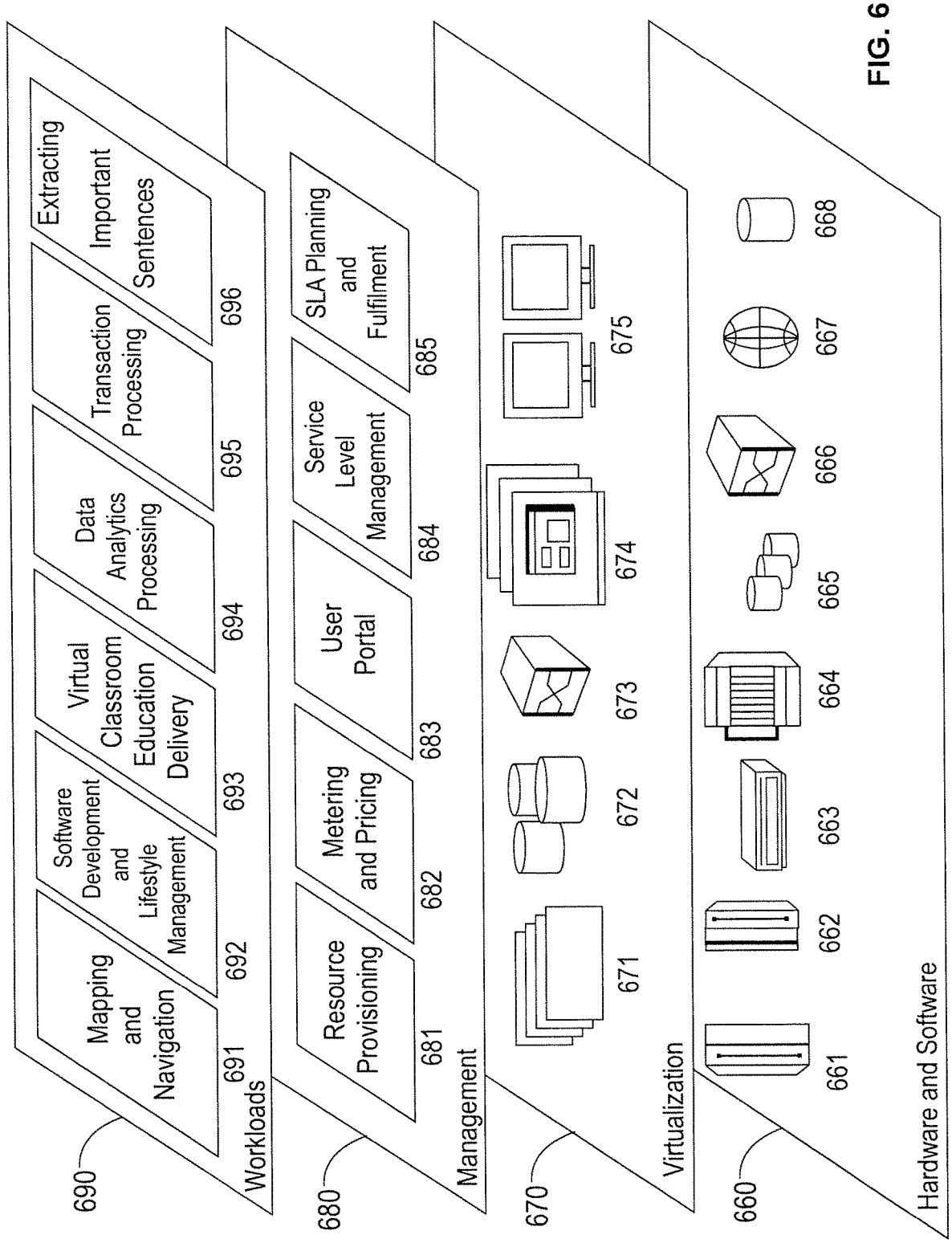
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and important sentence extraction from documents to answer a hypothesis (that includes a causal part and a consequence part) 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for machine-validating an input hypothesis sentence, comprising:
- extracting, by a hardware processor from a document database D using the input hypothesis sentence that includes a causal part and a consequence part, a set D1 of documents related to the causal part;
- extracting, by the hardware processor from the set D1 of documents, a set S of sentences that include one or more expressions of opinion;
- obtaining, by the hardware processor, a word list W of words that have a high co-occurrence in the set D1 of documents;
- selecting, by the hardware processor from the set S of sentences, a set S1 of sentences that are positionally close to any of the words in the word list W;
- selecting, by the hardware processor from the set S of sentences, a set S2 of sentences that are related to the words in the consequence part of the hypothesis; and
- extracting, by the hardware processor, and displaying, by a display device, sentences included in both the set S1 of sentences and the set S2 of sentences as opinion sentences in relation to the input hypothesis sentence.

2. The computer-implemented method of claim 1, wherein the set D1 of documents is related to the causal part based on word commonality between the causal part and each of the documents in the set D1 of documents.

3. The computer-implemented method of claim 1, wherein a given word in the word list W of words is obtained based on (i) a first ratio of a number of occurrences of the given word in any of the documents in the set D1 that include keywords related to the input hypothesis sentence, and (ii) a second ratio of a number of occurrences of the given word in set D1 over the total number of documents in the set D1.

4. The computer-implemented method of claim 3, wherein the first ratio is divided by the second ratio and evaluated relative to a threshold.

5. The computer-implemented method of claim 3, wherein the keywords related to the input hypothesis sentence are determined based on word commonality and word synonym commonality.

6. The computer-implemented method of claim 1, wherein the set S2 are selected based on a cosine similarity value for a candidate sentence for the set S2 being greater than a threshold value, wherein the cosine similarity value is determined between (i) words that occur in the consequence part of the input hypothesis sentence and (ii) objective words of an opinion in the candidate sentence for the set S2.

7. The computer-implemented method of claim 6, wherein said step of selecting the set S2 further comprises increasing a similarity weight between (i) the words that occur in the consequence part of the input hypothesis sentence and (ii) the objective words of the opinion in the candidate sentence for the set S2, responsive to a noun match ratio.

8. The computer-implemented method of claim 6, wherein said step of selecting the set S2 further comprises decreasing a similarity weight between (i) the words that occur in the consequence part of the input hypothesis sentence and (ii) the objective words of the opinion in the candidate sentence for the set S2, responsive to opposing word polarities.

9. The computer-implemented method of claim 1, wherein a threshold $\beta$ is used such that words having a co-occurrence above the threshold $\beta$ in the documents in the set D1 are added to the word list W.

10. The computer-implemented method of claim 1, wherein the document database D comprises news articles and report documents.

11. The computer-implemented method of claim 1, wherein the sentences in the set S are determined to be positionally close to any of the words in the word list W based on membership in both the word list W and the set S of sentences.

12. A computer program product for machine-validating an input hypothesis sentence, the computer program product comprising a non-transitory computer readable storage medium having program instructions embodied therewith, the program instructions executable by a computer to cause the computer to perform a method comprising:
- extracting, by a hardware processor from a document database D using the input hypothesis sentence that includes a causal part and a consequence part, a set D1 of documents related to the causal part;
- extracting, by the hardware processor from the set D1 of documents, a set S of sentences that include one or more expressions of opinion;
- obtaining, by the hardware processor, a word list W of words that have a high co-occurrence in the set D1 of documents;
- selecting, by the hardware processor from the set S of sentences, a set S1 of sentences that are positionally close to any of the words in the word list W;
- selecting, by the hardware processor from the set S of sentences, a set S2 of sentences that are related to the words in the consequence part of the hypothesis; and
- extracting, by the hardware processor, and displaying, by a display device, sentences included in both the set S1 of sentences and the set S2 of sentences as opinion sentences in relation to the input hypothesis sentence.

13. The computer program product of claim 12, wherein the set D1 of documents is related to the causal part based on word commonality between the causal part and each of the documents in the set D1 of documents.

14. The computer program product of claim 12, wherein a given word in the word list W of words is obtained based on (i) a first ratio of a number of occurrences of the given word in any of the documents in the set D1 that include keywords related to the input hypothesis sentence, and (ii) a second ratio of a number of occurrences of the given word in set D1 over the total number of documents in the set D1.

15. The computer program product of claim 14, wherein the first ratio is divided by the second ratio and evaluated relative to a threshold.

16. The computer program product of claim 14, wherein the keywords related to the input hypothesis sentence are determined based on word commonality and word synonym commonality.

17. The computer program product of claim 12, wherein the set S2 are selected based on a cosine similarity value for a candidate sentence for the set S2 being greater than a threshold value, wherein the cosine similarity value is determined between (i) words that occur in the consequence part of the input hypothesis sentence and (ii) objective words of an opinion in the candidate sentence for the set S2.

18. The computer program product of claim 17, wherein said step of selecting the set S2 further comprises increasing a similarity weight between (i) the words that occur in the consequence part of the input hypothesis sentence and (ii) the objective words of the opinion in the candidate sentence for the set S2, responsive to a noun match ratio.

19. The computer program product of claim 17, wherein said step of selecting the set S2 further comprises decreasing a similarity weight between (i) the words that occur in the consequence part of the input hypothesis sentence and (ii) the objective words of the opinion in the candidate sentence for the set S2, responsive to opposing word polarities.

20. A computer processing system for machine-validating an input hypothesis sentence, comprising:
  a memory device including program code stored thereon;
  a hardware processor, operatively coupled to the memory device, and configured to run the program code stored on the memory device to
    extract, from a document database D using the input hypothesis sentence that includes a causal part and a consequence part, a set D1 of documents related to the causal part;
    extract, from the set D1 of documents, a set S of sentences that include one or more expressions of opinion;
    obtain a word list W of words that have a high co-occurrence in the set D1 of documents;
    select, from the set S of sentences, a set S1 of sentences that are positionally close to any of the words in the word list W;
    select, from the set S of sentences, a set S2 of sentences that are related to the words in the consequence part of the hypothesis; and
    extract and cause to be displayed on a display device sentences included in both the set S1 of sentences and the set S2 of sentences as opinion sentences in relation to the input hypothesis sentence.

\* \* \* \* \*